US012767360B2

(12) United States Patent
Zhao

(10) Patent No.: US 12,767,360 B2
(45) Date of Patent: Oct. 20, 2026

(54) FOLDING UNMANNED AERIAL VEHICLE APPARATUS

(71) Applicant: Jason Zijie Zhao, West Vancouver (CA)

(72) Inventor: Jason Zijie Zhao, West Vancouver (CA)

(73) Assignee: Jason Zijie Zhao

( * ) Notice: Subject to any disclaimer, the term of this patent is extended or adjusted under 35 U.S.C. 154(b) by 59 days.

(21) Appl. No.: 18/917,593

(22) Filed: Oct. 16, 2024

(65) Prior Publication Data

US 2026/0109496 A1 Apr. 23, 2026

(51) Int. Cl.

| | |
|---|---|
| ***B64U 30/293*** | (2023.01) |
| ***B64U 10/14*** | (2023.01) |
| ***B64U 20/50*** | (2023.01) |
| ***B64U 50/15*** | (2023.01) |
| ***B64U 70/80*** | (2023.01) |

(52) U.S. Cl.

CPC ........... *B64U 30/293* (2023.01); *B64U 10/14* (2023.01); *B64U 20/50* (2023.01); *B64U 50/15* (2023.01); *B64U 70/80* (2023.01)

(58) Field of Classification Search

CPC .............................. B64U 30/293; B64U 20/50

See application file for complete search history.

(56) References Cited

U.S. PATENT DOCUMENTS

| | | | | |
|---|---|---|---|---|
| 9,969,491 | B2 * | 5/2018 | Strayer | B63G 3/04 |
| 10,894,599 | B1 * | 1/2021 | Popiks | B64C 11/00 |
| 11,390,382 | B1 * | 7/2022 | Anderson | B64D 1/12 |
| 11,702,202 | B1 * | 7/2023 | Anderson | B64C 1/30 244/17.23 |
| 2007/0018033 | A1 * | 1/2007 | Fanucci | F42B 15/22 244/49 |
| 2017/0152035 | A1 * | 6/2017 | Zhao | B64C 27/001 |
| 2019/0061914 | A1 * | 2/2019 | Heranger | B64C 11/06 |
| 2019/0077503 | A1 * | 3/2019 | Reddy | B64C 13/16 |
| 2022/0185501 | A1 * | 6/2022 | Kempley | B64U 10/14 |
| 2022/0219814 | A1 * | 7/2022 | Benedict | B64C 27/50 |
| 2022/0340259 | A1 * | 10/2022 | Yoon | B64C 11/28 |
| 2022/0388653 | A1 * | 12/2022 | Kuperman | B64C 27/33 |
| 2024/0017854 | A1 * | 1/2024 | Deng | B64U 20/75 |
| 2024/0102320 | A1 * | 3/2024 | Hollen | B64C 3/56 |
| 2025/0121964 | A1 * | 4/2025 | Eaton | B64U 20/50 |
| 2025/0289596 | A1 * | 9/2025 | Gokhale | B64U 30/293 |
| 2025/0333200 | A1 * | 10/2025 | Buchheim | B64U 10/14 |

FOREIGN PATENT DOCUMENTS

| | | | | |
|---|---|---|---|---|
| CN | 118004464 A | * | 5/2024 | B64U 70/70 |
| CN | 120589214 A | * | 9/2025 | B64U 30/293 |

OTHER PUBLICATIONS

Translation of CN-118004464-A (Year: 2024).*
Translation of CN 120589214 (Year: 2025).*

* cited by examiner

*Primary Examiner* — William L Gmoser

(57) ABSTRACT

The present invention relates to the technical field of unmanned aerial vehicles, and specifically discloses a folding unmanned aerial vehicle apparatus, including a small rocket body, where a mounting barrel is detachably disposed on the small rocket body, an unfolding opening is formed on the mounting barrel, and a folding unmanned aerial vehicle is fixedly disposed inside the mounting barrel. The present invention solves the problem that many unmanned aerial vehicles cannot fly quickly to long-distance locations in the prior art.

2 Claims, 5 Drawing Sheets

FOLDING UNMANNED AERIAL VEHICLE APPARATUS

FIELD OF TECHNOLOGY

The present invention relates to the technical field of unmanned aerial vehicles, and specifically discloses a folding unmanned aerial vehicle apparatus.

BACKGROUND

An unmanned aerial vehicle (UAV), is an unmanned aircraft operated by a radio remote control device or a pre-program control device.

Existing unmanned aerial vehicles are limited in flight speed and flight range and thus cannot fly quickly to long-distance operation locations, which leads to the inconveniences in mission execution.

SUMMARY

To solve the technical problem above: many unmanned aerial vehicles cannot fly quickly to long-distance locations, the present invention provides a folding unmanned aerial vehicle apparatus allowing a drone to be deployed from a secondary vessel such as a rocket.

A technical solution adopted by the present invention to solve the technical problem is as follows:

A folding unmanned aerial vehicle apparatus, including a small rocket body, where a mounting barrel is detachably disposed on the small rocket body, an unfolding opening is formed on the mounting barrel, and a folding unmanned aerial vehicle is fixedly disposed inside the mounting barrel.

Further, the unmanned aerial vehicle includes a top plate, a bottom plate, a connecting rod, a telescopic assembly, and a wing assembly, where the connecting rod is fixedly connected to the top plate and the bottom plate, the telescopic assembly is connected to the top plate and the wing assembly, and the wing assembly is connected to the bottom plate.

Further, the telescopic assembly includes an upper rotating seat, an upper rotating block, a sliding rod, a lower rotating block, a lower rotating seat, and a telescopic spring, where the upper rotating seat is fixedly connected to the top plate, the upper rotating block is fixedly connected to the sliding rod and rotatably connected to the upper rotating seat, the lower rotating block is slidably connected to the sliding rod and rotatably connected to the lower rotating seat, the telescopic spring is sleeved on the upper rotating block and the lower rotating block, and the lower rotating seat is connected to the wing assembly.

Further, the wing assembly includes a wing arm, a power motor, and a propeller, where the lower rotating seat is inserted into the wing arm, the wing arm is rotatably connected to the bottom plate and fixedly connected to the power motor, and the propeller is fixedly connected to an output shaft of the power motor.

Further, there are a plurality of telescopic assemblies and a plurality of wing assemblies.

Further, there are a plurality of connecting rods.

The present invention has the following beneficial effects:

1. According to the present invention, the unmanned aerial vehicle can be brought to a long-distance location using the small rocket body, the mounting barrel, and the unfolding opening, thereby improving the convenience of long-distance mission execution by the unmanned aerial vehicle, and solving the problem that many unmanned aerial vehicles cannot fly quickly to long-distance locations.
2. According to the present invention, the wing assembly can be rotated using the telescopic assembly, such that a folded state of the unmanned aerial vehicle can be formed, thereby conveniently mounting the unmanned aerial vehicle in the mounting barrel.
3. According to the present invention, the unmanned aerial vehicle and the mounting barrel can be conveniently driven to fly using the plurality of wing assemblies.

Figure 1:
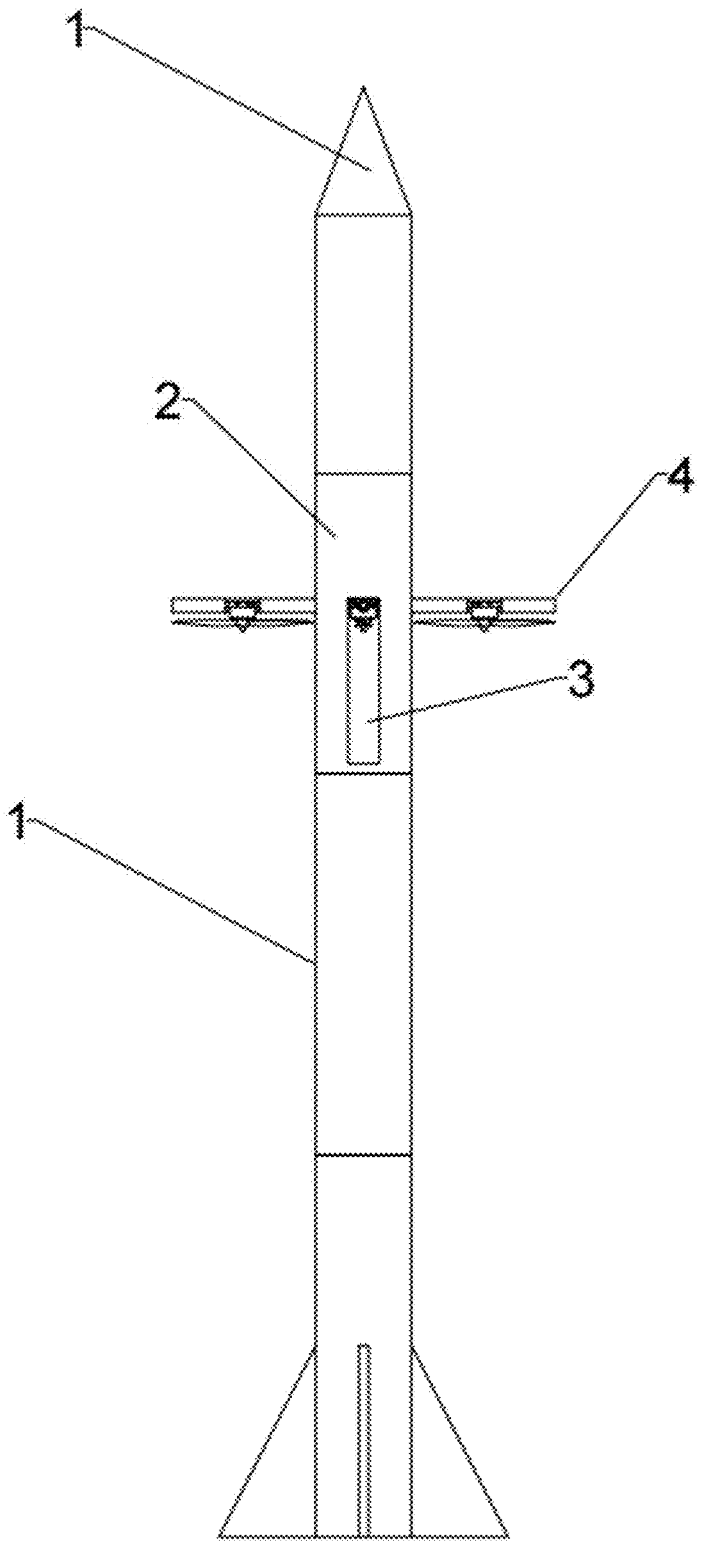
FIG. 1 is a schematic structural diagram of a folding unmanned aerial vehicle apparatus in the present invention.

in the drawings: 1—small rocket body, 2—mounting barrel, 3. unfolding opening, 4—wing assembly, 5—telescopic assembly, 6—top plate, 7—connecting rod, 8—bottom plate, 9—wing arm, 10—power motor, 11—propeller, 12—upper rotating seat, 13—upper rotating block, 14—telescopic spring, 15—lower rotating block, 16—sliding rod, and 17—lower rotating seat.

DESCRIPTION OF THE EMBODIMENTS

In order to deepen the understanding of the present invention, the present invention will be further described in detail below in conjunction with the accompanying drawings and an embodiment. The embodiment is only used to explain the present invention and does not limit the scope of protection of the present invention.

Embodiment

A specific implementation process of the present invention is as follows: a folding unmanned aerial vehicle apparatus, as shown in FIG. 1, including a small rocket body 1, where a mounting barrel 2 is detachably disposed on the small rocket body 1, an unfolding opening 3 is formed on the mounting barrel 2, and a folding unmanned aerial vehicle is fixedly disposed inside the mounting barrel.

After the small rocket body 1 is started, the small rocket body 1 can carry the unmanned aerial vehicle and the mounting barrel 2 to fly to a long-distance location. Then, the mounting barrel 2 is separated from the small rocket body 1, and the wing assembly 4 of the unmanned aerial vehicle extends from the unfolding opening 3 and carries the unmanned aerial vehicle and the mounting barrel 2 to continue flying. A parachute may be disposed on the small rocket body 1 to facilitate safe landing and reuse of the small rocket body 1.

Figure 2:
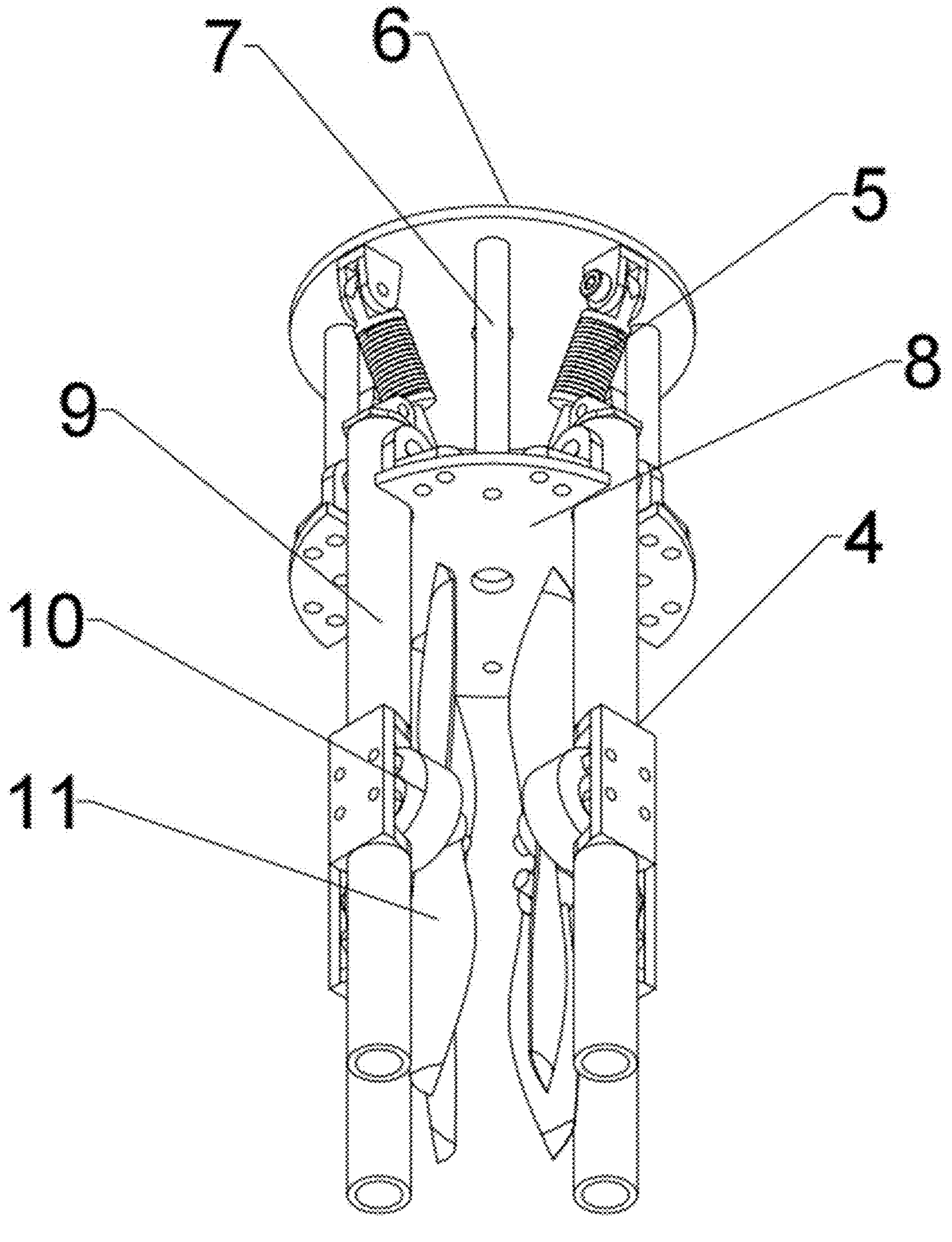
FIG. 2 is a folding state diagram of an unmanned aerial vehicle in FIG. 1.
Figure 3:
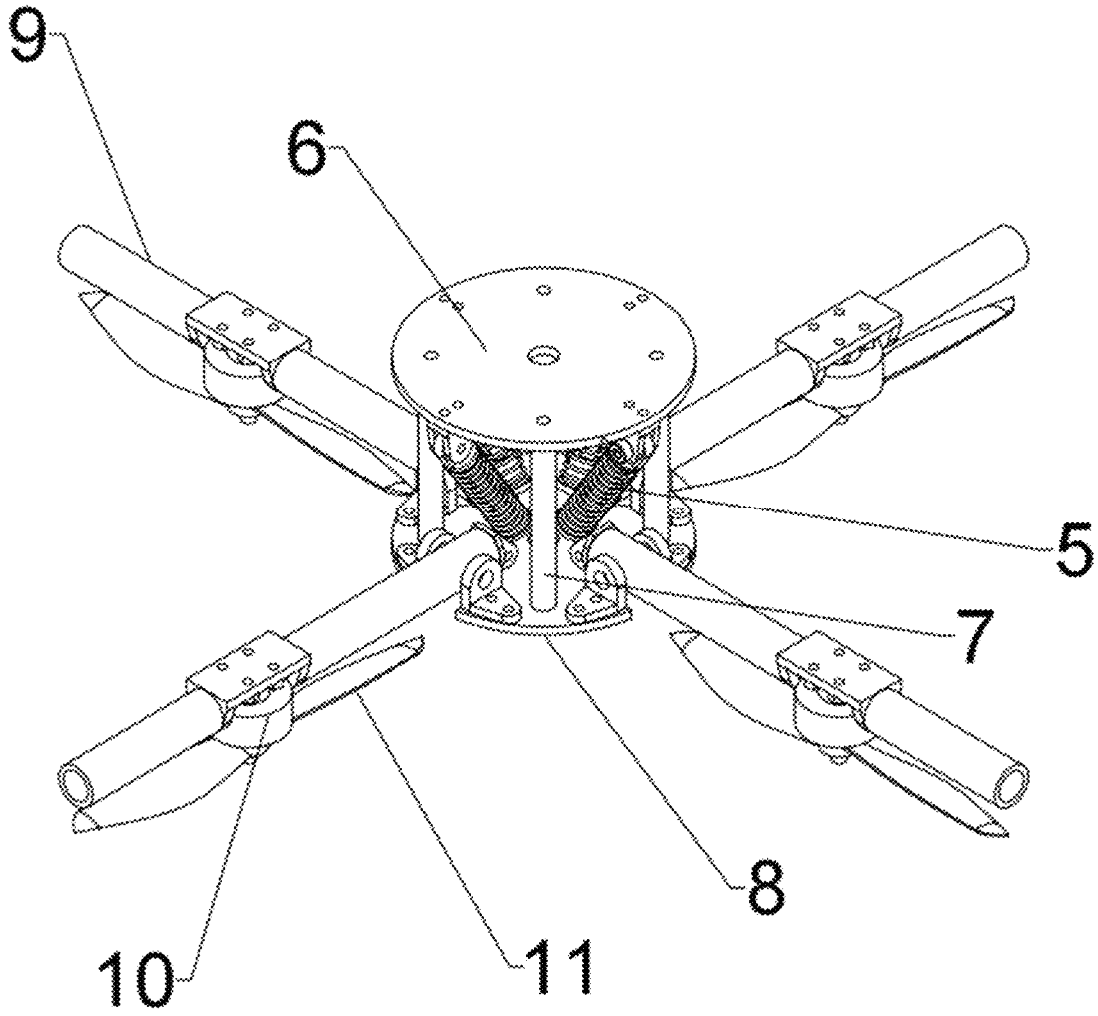
FIG. 3 is an unfolding state diagram of the unmanned aerial vehicle in FIG. 2.
Figure 4:
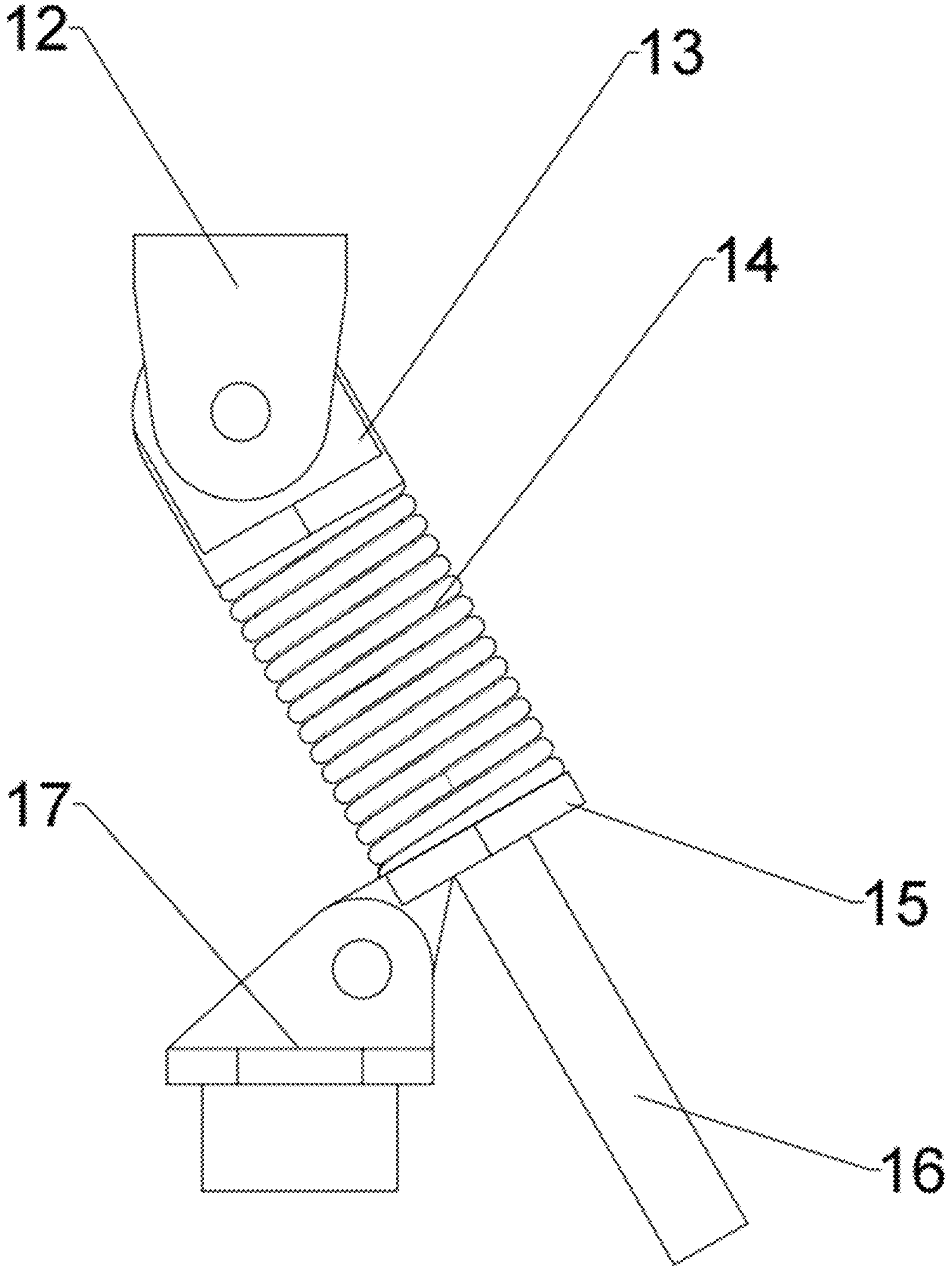
FIG. 4 is a schematic structural diagram of a telescopic assembly in FIG. 2.
Figure 5:
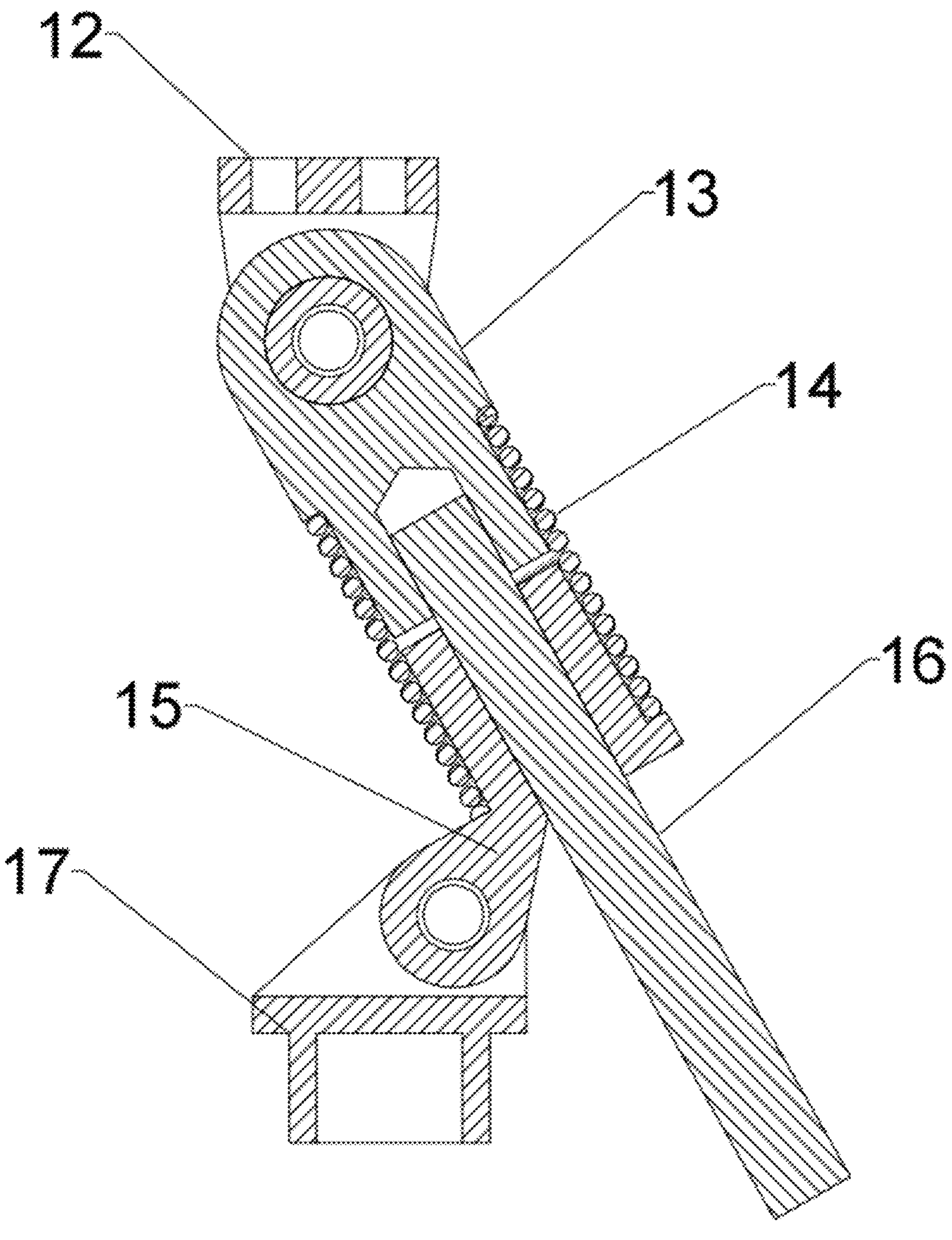
FIG. 5 is a sectional view of FIG. 4.

As shown in FIG. 2 and FIG. 3, the unmanned aerial vehicle includes a top plate 6, a bottom plate 8, a connecting rod 7, a telescopic assembly 5, and a wing assembly 4, where the connecting rod 7 is fixedly connected to the top plate 6 and the bottom plate 8, the telescopic assembly 5 is connected to the top plate 6 and the wing assembly 4, and the wing assembly 4 is connected to the bottom plate 8.

After the mounting barrel 2 is separated from the small rocket body 1, the telescopic assembly 5 will drive the wing assembly 4 to rotate, such that the wing assembly 4 can extend from the unfolding opening 3. Then, the wing assembly 4 is remotely operated to act, and the wing assembly 4 carries the mounting barrel 2 and the unmanned aerial vehicle to fly.

As shown in FIG. 2 to FIG. 5, the telescopic assembly 5 includes an upper rotating seat 12, an upper rotating block 13, a sliding rod 16, a lower rotating block 15, a lower rotating seat 17, and a telescopic spring 14, where the upper rotating seat 12 is fixedly connected to the top plate 6, the upper rotating block 13 is fixedly connected to the sliding rod 16 and rotatably connected to the upper rotating seat 12, the lower rotating block 15 is slidably connected to the sliding rod 16 and rotatably connected to the lower rotating seat 17, the telescopic spring 14 is sleeved on the upper rotating block 13 and the lower rotating block 15, and the lower rotating seat 17 is connected to the wing assembly 4.

A sliding hole is formed on the lower rotating block 15, the sliding rod 16 is slidably connected to the sliding hole, and the telescopic spring 14 can provide a thrust for unfolding of the wing assembly 4.

As shown in FIG. 2 and FIG. 3, the wing assembly 4 includes a wing arm 9, a power motor 10, and a propeller 11, where the lower rotating seat 17 is inserted into the wing arm 9, the wing arm 9 is rotatably connected to the bottom plate 8 and fixedly connected to the power motor 10, and the propeller 11 is fixedly connected to an output shaft of the power motor 10.

When the unmanned aerial vehicle is unfolded, the telescopic spring 14 will push the lower rotating block 15 to rotate downwards, and the lower rotating block 15 will slide along the sliding rod 16 and push the lower rotating seat 17 and the wing arm 9 to rotate upwards. When the wing arm 9 rotates to a horizontal position, the unmanned aerial vehicle is in an unfolded state. When the wing arm 9 is rotated counterclockwise, the wing arm 9 will push the lower rotating block 15 to rotate upwards by the lower rotating seat 17, and the lower rotating block 15 will approach the upper rotating block 13 along the sliding rod 16 and compress the telescopic spring 14. When the wing arm 9 rotates to a vertical position, the unmanned aerial vehicle is in a folded state. The power motor 10 is in wireless electrical connection with an external remote controller. When the unmanned aerial vehicle is in the unfolded state, a staff can operate the remote controller to start the power motor 10, and the output shaft of the power motor 10 will drive the propeller 11 to rotate, such that the unmanned aerial vehicle and the mounting barrel 2 are capable of flying.

As shown in FIG. 1 to FIG. 3, there are a plurality of telescopic assemblies 5 and a plurality of wing assemblies 4.

When the unmanned aerial vehicle is in the folded state, a plurality of wing arms 9 can be tied with a binding device (such as a rope and a strap), such that the plurality of wing arms 9 can be kept in a vertical state. Then, the unmanned aerial vehicle in the folded state is placed in the mounting barrel 2 and fixed, and the plurality of wing arms 9 are aligned with a plurality of unfolding openings 3. A shearing device (such as electric scissors) may be disposed in the mounting barrel 2. The shearing device is in wireless electrical connection with the external remote controller and is aligned with the binding device. When the unmanned aerial vehicle is to be unfolded, the remote controller controls the shearing device to shear off the binding device, and the telescopic springs 14 will unfold the unmanned aerial vehicle.

As shown in FIG. 2 and FIG. 3, there are a plurality of connecting rods 7.

The plurality of connecting rods 7 can enable the top plate 6 and the bottom plate 8 to be connected to each other more stably.

The above embodiment should not limit the present invention in any way. Any technical solutions obtained by equivalent substitution or equivalent transformation fall within the scope of protection of the present invention.

What is claimed is:

1. A folding unmanned aerial vehicle apparatus, comprising a rocket body, wherein a mounting barrel is detachably disposed on the rocket body, an unfolding opening is formed on the mounting barrel, and a folding unmanned aerial vehicle is fixedly disposed inside the mounting barrel;

wherein the unmanned aerial vehicle comprises a top plate, a bottom plate, a connecting rod, a telescopic assembly, and a propeller propulsion assembly, the connecting rod is fixedly connected to the top plate and the bottom plate, the telescopic assembly is connected to the top plate and the propeller propulsion assembly, and the propeller propulsion assembly is connected to the bottom plate;

wherein the telescopic assembly comprises an upper rotating seat, an upper rotating block, a sliding rod, a lower rotating block, a lower rotating seat, and a telescopic spring, the upper rotating seat is fixedly connected to the top plate, the upper rotating block is fixedly connected to the sliding rod and rotatably connected to the upper rotating seat, the lower rotating block is slidably connected to the sliding rod and rotatably connected to the lower rotating seat, the telescopic spring is sleeved on the upper rotating block and the lower rotating block, and the lower rotating seat is connected to the propeller propulsion assembly.

2. The folding unmanned aerial vehicle apparatus according to claim 1, wherein the propeller propulsion assembly comprises a wing arm, a power motor, and a propeller, the lower rotating seat is inserted into the wing arm, the wing arm is rotatably connected to the bottom plate and fixedly connected to the power motor, and the propeller is fixedly connected to an output shaft of the power motor.

* * * * *